(12) United States Patent
Kastens et al.

(10) Patent No.: US 11,280,378 B2
(45) Date of Patent: Mar. 22, 2022

(54) METHOD AND CONTROL SYSTEM FOR OPERATING A DRIVE TRAIN

(71) Applicant: ZF Friedrichshafen AG, Friedrichshafen (DE)

(72) Inventors: Jens Kastens, Tettnang (DE); Frank Deprez, Mariabrunn (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 0 days.

(21) Appl. No.: 16/881,413

(22) Filed: May 22, 2020

(65) Prior Publication Data

US 2020/0370610 A1 Nov. 26, 2020

(30) Foreign Application Priority Data

May 24, 2019 (DE) .................... 10 2019 207 659.9

(51) Int. Cl.
*F16D 48/10* (2006.01)
*F16D 48/06* (2006.01)

(52) U.S. Cl.
CPC ........... *F16D 48/064* (2013.01); *F16D 48/10* (2013.01); *F16D 2500/1066* (2013.01);
(Continued)

(58) Field of Classification Search
CPC ................ F16D 48/064; F16D 48/10; F16D 2500/1066; F16D 2500/30425;
(Continued)

(56) References Cited

U.S. PATENT DOCUMENTS

| 7,770,675 B2 | 8/2010 | Hayashi | |
|---|---|---|---|
| 2009/0312143 A1* | 12/2009 | Allgaier | B60K 6/543 477/5 |
| 2016/0010707 A1* | 1/2016 | Milehins | F16D 48/06 701/68 |

FOREIGN PATENT DOCUMENTS

| DE | 102016218289 A1 | 4/2017 |
|---|---|---|
| DE | 102015016964 A1 | 6/2017 |

(Continued)

OTHER PUBLICATIONS

JP2008304030 machine translation filed Jul. 15, 2021 (Year: 2021).*

(Continued)

*Primary Examiner* — Tisha D Lewis
(74) *Attorney, Agent, or Firm* — Dority & Manning, P.A.

(57) ABSTRACT

A method for operating a drive train of a motor vehicle with a prime mover (1) including an internal combustion engine (2) and an electric machine (3), a separating clutch (6) connected between the internal combustion engine and the electric machine, and a transmission (5) connected between the prime mover (1) and a driven end (4) is provided. When at least one first operating condition is present, a previously decoupled internal combustion engine (2) is coupled such that the separating clutch (6) is actuated to engage. When at least one second operating condition is present, the coupling of the internal combustion engine is aborted, and an absolute value of a torque currently transmitted or currently transmittable by the separating clutch (6) is determined. The separating clutch (6) is disengaged at different rates depending on the absolute value of the torque currently transmitted or currently transmittable by the separating clutch (6).

13 Claims, 2 Drawing Sheets

(52) U.S. Cl.
CPC .............. *F16D 2500/3067* (2013.01); *F16D 2500/30425* (2013.01); *F16D 2500/30426* (2013.01); *F16D 2500/30814* (2013.01)

(58) Field of Classification Search
CPC ... F16D 2500/30426; F16D 2500/3067; F16D 2500/30814
See application file for complete search history.

(56) References Cited

FOREIGN PATENT DOCUMENTS

| | | | |
|---|---|---|---|
| EP | 1826088 A2 | 8/2007 | |
| JP | 2008304030 A | * 12/2008 | ............. F16D 48/02 |

OTHER PUBLICATIONS

DE102016218289 machine translation filed Jul. 8, 2021 (Year: 2021).*
DE 102015016964 machine translation filed Jul. 8, 2021 (Year: 2021).*
German Search Report DE102019207659.9, dated Jan. 21, 2020, (14 pages).

* cited by examiner

METHOD AND CONTROL SYSTEM FOR OPERATING A DRIVE TRAIN

CROSS-REFERENCE TO RELATED APPLICATION

The present application is related and has right of priority to German Patent Application No. 10 2019 207 659.9 filed on May 24, 2019, which is incorporated by reference in its entirety for all purposes.

FIELD OF THE INVENTION

The invention relates generally to a method for operating a drive train. Moreover, the invention relates generally to a control system for operating a drive train.

BACKGROUND

EP 1 826 088 A2 describes a method for operating a motor vehicle designed as a hybrid vehicle. The hybrid vehicle to be operated includes a prime mover encompassing an internal combustion engine and an electric machine. A separating clutch is connected between the internal combustion engine and the electric machine of the prime mover. A transmission is connected between the prime mover and a driven end. It is provided that, for the case in which a defined first operating condition has been met, the internal combustion engine is started. This takes place for the case in which the internal combustion engine is necessary in order to meet the driver demand. Moreover, it is provided that the start of the internal combustion engine is aborted if a second operating condition is present. This takes place for the case in which the brake is actuated again within a predetermined time period. In order to start the internal combustion engine, the separating clutch—which is connected between the internal combustion engine and the electric machine—is actuated, in order to couple the internal combustion engine.

For the case in which a coupling of an internal combustion engine is aborted, losses of comfort may have so far occurred. Namely, in the presence of an operating condition, on the basis of which the coupling of an internal combustion engine is aborted, if the separating clutch connected between the internal combustion engine and the electric machine is abruptly disengaged, this can result in an undesirably strong run-up of the internal combustion engine, whereby, on the one hand, noises and, on the other hand, vibrations in the drive train can be caused. In order to avoid this, it has previously only been possible to carry out the coupling process to the end despite the presence of an abort condition, and to couple the internal combustion engine again only after a defined time period has elapsed. This approach is also disadvantageous, however.

SUMMARY OF THE INVENTION

There is a need, for the case in which an abort of the coupling of the internal combustion engine is demanded, that this be carried out as quickly as possible with a high level of comfort. On the basis thereof, example aspects of the invention creates a new type of method for operating a drive train and a control system for operating a drive train.

For the case in which the at least one second defined operating condition is present, an absolute value of a torque currently transmitted or currently transmittable by the separating clutch is determined. The separating clutch is disengaged at different rates depending on the absolute value of the torque currently transmitted or currently transmittable by the separating clutch. With the aid of example aspects of the invention, it is possible, in the presence of an abort for the coupling of an internal combustion engine, to decouple the internal combustion engine with a high level of comfort within a short time.

According to one advantageous example refinement, for the case in which the absolute value of the torque currently transmitted or currently transmittable by the separating clutch is less than a limiting value, the separating clutch is disengaged, preferably in a stepwise manner, at a first speed. For the case in which the absolute value of the torque currently transmitted or currently transmittable by the separating clutch is greater than the limiting value, the separating clutch is disengaged at a second speed, which is less than the first speed, preferably continuously with a torque gradient along a ramp. In this way, it is particularly advantageously possible, in the presence of an abort for the coupling of an internal combustion engine, to decouple the internal combustion engine with a high level of comfort within a short time.

According to one advantageous example refinement, in order to disengage the separating clutch at the second speed, on the one hand, a torque gradient is determined, on the basis of which the separating clutch is disengaged in a torque-controlled manner; on the other hand, a specified rotational speed for the internal combustion engine is determined, on the basis of which the internal combustion engine is operated in a speed-controlled manner in overlap with the torque-controlled operation of the separating clutch. The internal combustion engine can be decoupled with a high level of comfort within a short time.

According to one advantageous example refinement, the torque gradient is determined depending on a torque, which must be decreased at the separating clutch, so that the electric machine can solely provide a driver-input torque, and/or depending on a current gradient of the transmission input torque. Preferably, the torque gradient is that much steeper, the higher the torque is, that must be decreased at the separating clutch, so that the electric machine can provide the driver-input torque. Moreover, the torque gradient is preferably that much steeper, the higher is the current gradient of the transmission input torque. This enables the advantageous determination of the torque gradient for the torque-controlled operation of the separating clutch.

According to one advantageous example refinement, the specified rotational speed for the internal combustion engine is determined depending on a current differential speed at the separating clutch and depending on the current gradient of the differential speed at the separating clutch. This enables the advantageous determination of the specified rotational speed for the speed-controlled operation of the internal combustion engine.

BRIEF DESCRIPTION OF THE DRAWINGS

Exemplary embodiments of the invention are explained in greater detail with reference to the drawings, without being limited thereto. Wherein.

DETAILED DESCRIPTION

Figure 1:
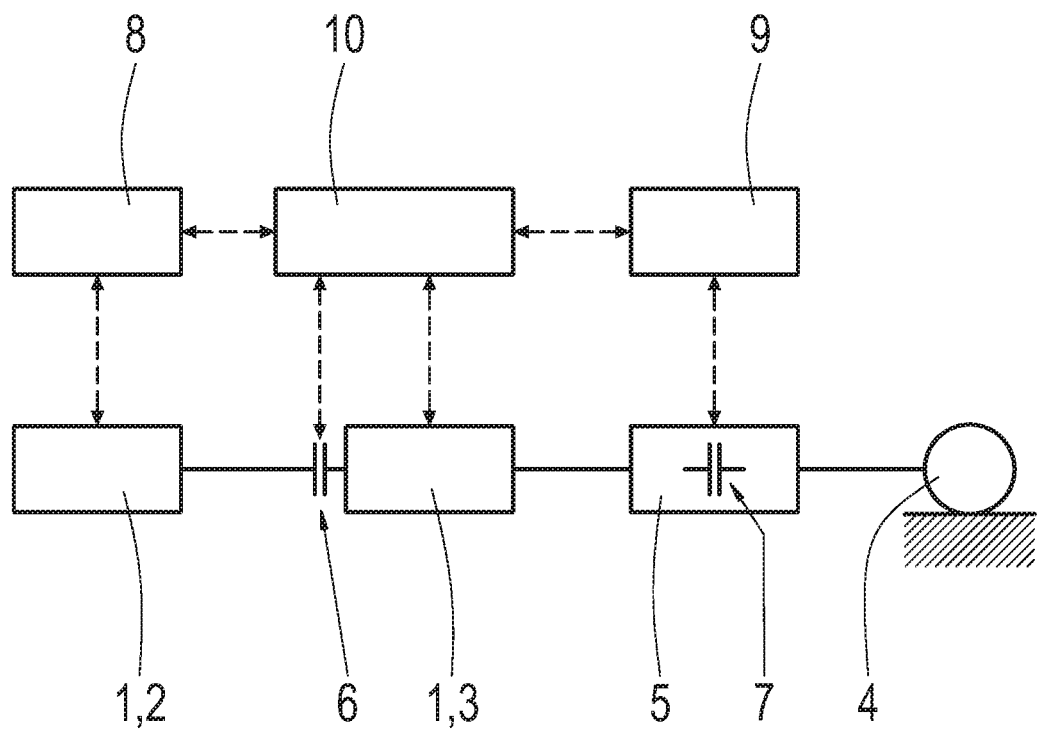
FIG. 1 shows a diagram of a drive train of a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a diagram of a drive train of a motor vehicle designed as a hybrid vehicle.

The motor vehicle from FIG. 1 includes a prime mover 1 with an internal combustion engine 2 and an electric machine 3. A transmission 5 is connected between the prime mover 1 and a driven end 4. A separating clutch 6 is connected between the internal combustion engine 2 and the electric machine 3. For the case in which the separating clutch 6 is disengaged, the internal combustion engine 2 is decoupled. When the separating clutch 6 is engaged, however, the internal combustion engine 2 is coupled. Moreover, FIG. 1 shows, by way of example, a shift element 7 of the transmission 5. The transmission 5 includes multiple such shift elements 7, in order to make gears available.

Moreover, FIG. 1 shows an engine control unit 8, a transmission control unit 9, and a hybrid control unit 10. The engine control unit 8 is utilized for the closed-loop control and/or open-loop control of the operation of the internal combustion engine 2. The transmission control unit 9 is utilized for the open-loop control and/or closed-loop control of the operation of the transmission 5. The hybrid control unit 10 is utilized for the open-loop control and/or closed-loop control of the operation of the electric machine 3 and, in FIG. 1, of the separating clutch 6. The hybrid control unit 10 can be an integral part of the transmission control unit 9.

For the case in which driving takes place purely electrically via the electric machine 3, the separating clutch 6 is disengaged and the internal combustion engine 2 is decoupled. In this case, the internal combustion engine 2 is preferably shut down. The internal combustion engine 2 can also run at idling speed in the decoupled condition, however. Depending on a defined first operating condition, a coupling of the internal combustion engine 2 can be demanded, in particular for the case in which the electric machine 3 alone cannot provide a driver-input torque. In this case, if the internal combustion engine 2 is shut down, the internal combustion engine 2 is started and the separating clutch 6 is engaged. However, if the internal combustion engine 2 is already running in this condition, it is only necessary for the separating clutch 6 to be engaged. Depending on at least one second defined operating condition, an abort for the coupling of the internal combustion engine 2 can be demanded, in particular, for example, via a driver-side actuation of a brake pedal and/or via a cancellation of a driver-input torque, for example, via a cancellation of an accelerator pedal actuation. In this case, the separating clutch 6 must be disengaged again.

Example aspects of the present invention now relates to such details, with the aid of which the coupling of the internal combustion engine 2 can be aborted in an advantageous manner, with a high level of comfort and within a short time.

According to example aspects of the invention, for the case in which the at least one second operating condition is present, which demands an abort for the coupling of the internal combustion engine 2, a check is carried out to determine how high an absolute value is of a torque currently transmitted or transmittable by the separating clutch 6. The separating clutch is disengaged at different rates depending on the absolute value of the torque currently transmitted or currently transmittable by the separating clutch.

For the case in which the absolute value of the torque currently transmitted or currently transmittable by the separating clutch 6 is less than a limiting value, the separating clutch 6 is disengaged at a first speed, preferably in a stepwise manner and completely.

However, for the case in which the absolute value of the torque currently transmitted or currently transmittable by the separating clutch 6 is greater than the limiting value, the separating clutch is not disengaged at the first speed and/or abruptly, but rather more slowly at a second speed, preferably, e.g., continuously along an, in particular, linear ramp having a defined torque gradient with respect to time.

This limiting value for the absolute value of the currently transmitted or currently transmittable torque of the separating clutch 6 can correspond to the drag torque of the separating clutch 6 increased by an offset.

For the case in which the separating clutch 6 is disengaged along a linear ramp, this torque gradient is constant during the disengagement.

In order to disengage the separating clutch 6 with the torque gradient, the separating clutch 6 is disengaged in a torque-controlled manner, in particular starting from the hybrid control unit 10 or the transmission control unit 9.

The internal combustion engine 2 is operated in a speed-controlled manner in overlap, with respect to time, with the torque-controlled operation of the separating clutch 6, wherein, for this purpose, a specified rotational speed for the internal combustion engine 2 is determined, with the aid of which the internal combustion engine 2 is actuated starting from the engine control unit 8. The determination of the specified rotational speed for the internal combustion engine 2 can take place either in the hybrid control unit 10 or in the transmission control unit 9, wherein the specified rotational speed is then made available to the engine control unit 8.

The torque gradient for the torque-controlled operation of the separating clutch 6 is preferably determined depending on a torque, which must be decreased at the separating clutch 6, so that the electric machine 3 can solely provide a driver-input torque. This torque is preferably determined with the following:

$$\Delta M_{K0} = (M_{FW} - M_{GE}) - (M_{EM\text{-}MIN} - M_{EM\text{-}IST}),$$

wherein $\Delta M_{K0}$ is the determined torque,
$M_{FW}$ is the current driver-input torque,
$M_{GE}$ is the current transmission input torque,
$M_{EM\text{-}MIN}$ is the minimally possible torque of the electric machine, and
$M_{EM\text{-}IST}$ is the current torque of the electric machine.

Figure 2:
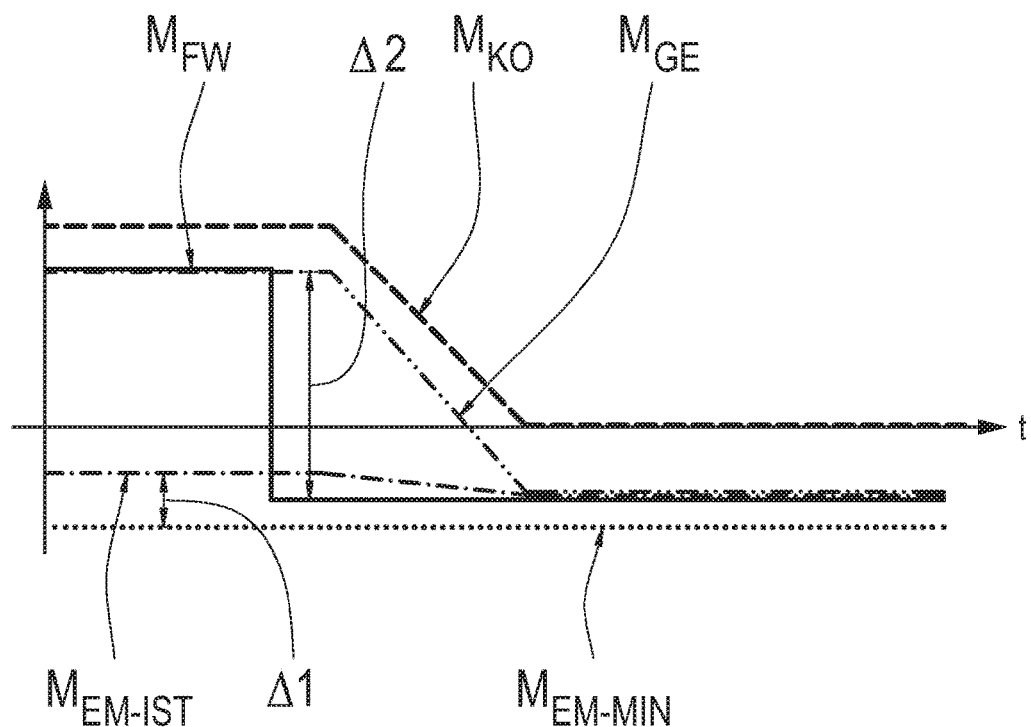
FIG. 2 shows a diagram for illustrating the method according to example aspects of the invention for operating a drive train of a motor vehicle.

The aforementioned determination of the torque $\Delta M_{K0}$, which must be decreased at the separating clutch 6, so that the electric machine 3 can make the driver-input torque available, is visualized in FIG. 2. FIG. 2 shows, with respect to the time t, the torque profiles for the current driver-input torque $M_{FW}$, for the current transmission input torque $M_{GE}$, for the minimally possible torque $M_{EM\text{-}MIN}$ of the electric machine 3, and for the current torque $M_{EM\text{-}IST}$ of the electric machine 3.

The torque difference $\Delta 1$ corresponds to the difference between the minimally possible torque $M_{EM\text{-}MIN}$ of the electric machine 3 and the current torque $M_{EM\text{-}IST}$ of the electric machine 3. The torque difference Δ2 corresponds to the difference between the driver-input torque $M_{FW}$ and the current transmission input torque $M_{GE}$. The torque $\Delta M_{K0}$ results from the difference Δ2−Δ1.

The torque gradient for the torque-controlled operation of the separating clutch 6 is preferably determined depending not only on the above-described torque $\Delta M_{K0}$, but rather preferably additionally depending on a current gradient of the transmission input torque $M_{GE}$.

The torque gradient for the torque-controlled operation of the separating clutch 6 is that much steeper, the greater the torque $\Delta M_{K0}$ is that must be decreased at the separating clutch 6.

Moreover, the torque gradient for the torque-controlled operation of the separating clutch 6 is that much steeper, the greater is the current gradient of the transmission input torque $M_{GE}$. Thus, e.g., the torque gradient for the torque-controlled operation of the separating clutch 6 may increase in correspondence with the current gradient of the transmission input torque $M_{GE}$.

In overlap, with respect to time, with this torque-controlled operation, namely the torque-controlled disengagement of the separating clutch 6 depending on the torque gradient determined in the above-described way, the specified rotational speed for the internal combustion engine 2 is determined, on the basis of which the internal combustion engine 2 is operated in a speed-controlled manner in overlap with the torque-controlled operation of the separating clutch 6.

The specified rotational speed for the internal combustion engine 2 is determined depending on a current differential speed at the separating clutch 6 and depending on the current gradient, with respect to time, of the differential speed at the separating clutch 6.

Figure 3:
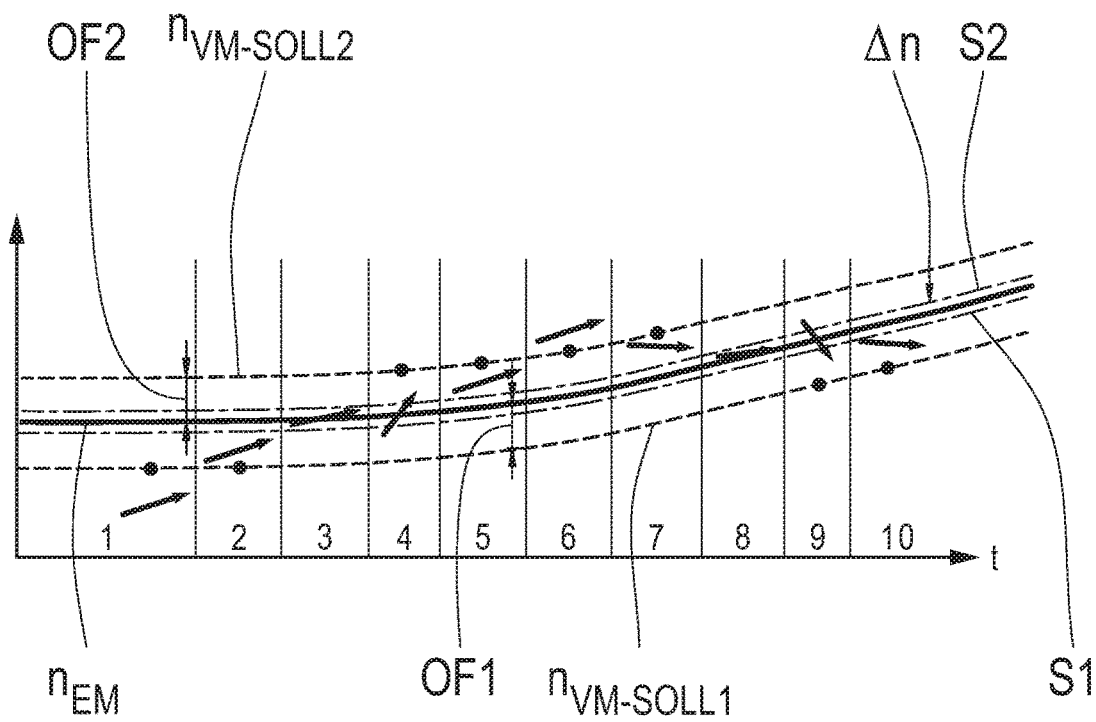
FIG. 3 shows a further diagram for illustrating the method according to example aspects of the invention for operating a drive train of a motor vehicle.

The determination of the specified rotational speed for the internal combustion engine 2 is described in the following with reference to the diagram from FIG. 3, wherein FIG. 3 shows a graph, with respect to the time t, on the one hand, of a time profile of the rotational speed $n_{EM}$ of the electric machine 3 and, on the other hand, a rotational speed range Δn for the rotational speed of the separating clutch 6 spanning the rotational speed $n_{EM}$ of the electric machine 3. This rotational speed range Δn is defined by a lower limiting value S1 and an upper limiting value S2.

If the rotational speed at the separating clutch 6 lies within this rotational speed range Δn, the differential speed at the separating clutch 6 is less than a corresponding limiting value.

If the rotational speed at the separating clutch 6 lies outside this rotational speed range Δn, the differential speed at the separating clutch 6 is greater than the corresponding limiting value.

Moreover, FIG. 3 shows two possible specified rotational speeds $n_{VM-SOLL1}$ and $n_{VM-SOLL2}$ for the internal combustion engine 2, which each result from the current rotational speed $n_{EM}$ of the electric machine 3 plus an offset OF1 or OF2, respectively. The arrows from FIG. 3 indicate, in each case, where the current rotational speed at the separating clutch 6 is located, wherein the slope of the particular arrow visualizes the magnitude of the current gradient of the differential speed at the separating clutch 6.

For the case in which the current differential speed at the separating clutch 6 and the current gradient of the differential speed at the separating clutch 6 are each less than a corresponding limiting value, no specified rotational speed for the internal combustion engine 2 is determined, or the current rotational speed $n_{EM}$ of the electric machine 3 is determined as the specified rotational speed for the internal combustion engine 2. In this case, the separating clutch 6 is considered to be engaged. This is the case, in FIG. 3, in the time intervals 3 and 8. In these time intervals 3 and 8, the rotational speed of the separating clutch 6 lies within the rotational speed range Δn and the gradient of the differential speed is low.

For the case in which the current differential speed at the separating clutch 6 and/or the current gradient of the differential speed at the separating clutch 6 are/is greater than the corresponding limiting value, a rotational speed is determined, as the specified rotational speed for the internal combustion engine 2, which corresponds to the current rotational speed $n_{EM}$ of the electric machine 3 plus the offset. In this way, a synchronization of the separating clutch 6 is prevented. In the time intervals 1, 2, 9, 10 from FIG. 3, the specified rotational speed $n_{VM-SOLL1}$ is utilized as the specified rotational speed for the internal combustion engine 2 and, in the time intervals 4, 5, 6, 7 from FIG. 3, the specified rotational speed $n_{VM-SOLL2}$ is utilized as the specified rotational speed.

If the rotational speed of the separating clutch 6 lies outside the rotational speed range Δn, namely below the rotational speed range Δn, the current rotational speed $n_{EM}$ of the electric machine 3, reduced by the offset OF1, is utilized as the specified rotational speed $n_{VM-SOLL1}$.

However, if the rotational speed at the separating clutch 6 lies above the rotational speed range Δn, the rotational speed $n_{EM}$ of the electric machine 3, increased by the offset OF2, is utilized as the specified rotational speed $n_{VM-SOLL2}$, as the specified rotational speed for the internal combustion engine 2.

If the rotational speed at the separating clutch 6 lies within the rotational speed range Δn, but the absolute value of the gradient of the differential speed at the separating clutch 6 is greater than the corresponding limiting value, then, depending on whether the gradient is positive or negative, either the rotational speed $n_{EM}$ of the electric machine 3 reduced by the offset OF1 or the rotational speed $n_{EM}$ of the electric machine 3 increased by the offset OF2 is utilized as the specified rotational speed, namely, in the case of a positive high gradient, the specified rotational speed $n_{VM-SOLL2}$ increased by the offset OF2 and, in the case of a large negative gradient, the specified rotational speed $n_{VM-SOLL1}$ reduced by the offset OF1.

If the rotational speed of the internal combustion engine 2 is below the rotational speed $n_{EM}$ of the electric machine 3, then, alternatively, the internal combustion engine 2 can also be stopped.

The offset values OF1 and OF2 can have the same absolute value but also deviate from each other such that the offset values OF1 and OF2 have different absolute values.

With the aid of example aspects of the invention, for the case in which, in the presence of at least one abort criterion for the coupling of the internal combustion engine 2, the torque currently transmitted or currently transmittable by the separating clutch 6 is greater than the limiting value, a comfortable and also fast disengagement of the separating clutch 6 and, therefore, decoupling of the internal combustion engine 2 is possible and, in fact, without the risk of an undesirable noise development as well as without the risk of undesirable oscillations and/or vibrations in the drive train.

The invention also relates generally to a control system for operating the motor vehicle, which includes at least the transmission control unit 9 and the engine control unit 8 as well as the hybrid control unit 10. The hybrid control unit 10 can be an integral part of the transmission control unit 9. For the case in which at least one second defined operating condition for the abort of the coupling of the internal combustion engine 2 is present, the transmission control unit 9 and/or the hybrid control unit 10 check(s) the level of the torque currently transmitted or currently transmittable by the separating clutch 6. Depending on the absolute value of the torque currently transmitted or currently transmittable by the separating clutch 6, the transmission control unit 9 or the hybrid control unit 10 disengages the separating clutch 6 at different rates.

The control units 8, 9 and 10 are therefore configured for implementing the method according to example aspects of the invention on the control side. For this purpose, the control units 8, 9 and 10 of the control system include hardware-related and software-related means. The hardware-related means include data interfaces for exchanging data with assemblies contributing to the implementation of the method according to example aspects of the invention. Moreover, the hardware-related means include a processor for data processing and a memory for data storage. The software-related means include program components, which are utilized for implementing the method according to example aspects of the invention.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE NUMBERS

1 prime mover
2 internal combustion engine
3 electric machine
4 driven end
5 transmission
6 separating clutch
7 shift element
8 engine control unit
9 transmission control unit
10 hybrid control unit

The invention claimed is:

1. A method for operating a drive train of a motor vehicle, the drive train comprising a prime mover (1) with an internal combustion engine (2) and an electric machine (3), a separating clutch (6) connected between the internal combustion engine (2) and the electric machine (3), and a transmission (5) connected between the prime mover (1) and a driven end (4), the method comprising:
    in response to at least one first defined operating condition, coupling a previously decoupled internal combustion engine (2) by actuating the separating clutch (6) to engage;
    in response to at least one second defined operating condition, aborting the coupling of the internal combustion engine (2) by actuating the separating clutch (6) to disengage; and
    determining an absolute value of a torque currently transmitted or currently transmittable by the separating clutch (6),
    wherein the separating clutch (6) is disengaged at different rates depending on the absolute value of the torque currently transmitted or currently transmittable by the separating clutch (6), and
    wherein actuating the separating clutch (6) to disengage comprises
        disengaging the separating clutch (6) at a first speed when the absolute value of the torque currently transmitted or currently transmittable by the separating clutch (6) is less than a limiting value, and
        disengaging the separating clutch (6) at a second speed when the absolute value of the torque currently transmitted or currently transmittable by the separating clutch (6) is greater than the limiting value,
    wherein the second speed is less than the first speed.

2. The method of claim 1, wherein disengaging the separating clutch (6) at the first speed comprises disengaging the separating clutch (6) at the first speed in a step-wise manner when the absolute value of the torque currently transmitted or currently transmittable by the separating clutch (6) is less than the limiting value.

3. The method of claim 1, wherein disengaging the separating clutch (6) at the second speed comprises disengaging the separating clutch (6) at the second speed continuously with a torque gradient when the absolute value of the torque currently transmitted or currently transmittable by the separating clutch (6) is greater than the limiting value.

4. The method of claim 3, wherein disengaging the separating clutch (6) at the second speed comprises disengaging the separating clutch (6) at the second speed continuously along a ramp with a torque gradient when the absolute value of the torque currently transmitted or currently transmittable by the separating clutch (6) is greater than the limiting value.

5. The method of claim 1, wherein disengaging the separating clutch (6) at the second speed comprises:
    determining a torque gradient, and disengaging the separating clutch (6) in a torque-controlled manner based on the determined torque gradient; and
    determining a specified rotational speed for the internal combustion engine (2), and operating the internal combustion engine (2) in a speed-controlled manner based on the determined specified rotational speed.

6. The method of claim 5, wherein determining the torque gradient comprises determining the torque gradient depending on a torque (66 MK0), the torque ($\Delta$MK0) decreasable at the separating clutch (6) such that the electric machine (3) provides a driver-input torque, the torque gradient increasing with the torque ($\Delta$MK0).

7. The method of claim 6, further comprising determining the torque ($\Delta$MK0) with the following
$\Delta MK0 = (M_{FW} - M_{GE}) - (M_{EM-MIN} - M_{EM-IST})$,
wherein
$M_{FW}$ is a current driver-input torque,
$M_{GE}$ is a current transmission input torque,
$M_{EM-MIN}$ is a minimally possible torque of the electric machine (3), and
$M_{EM-IST}$ is a current torque of the electric machine (3).

8. The method of claim 5, wherein determining the torque gradient comprises determining the torque gradient depending on a current gradient of a transmission input torque, the torque gradient increasing with the current gradient of the transmission input torque.

9. The method of claim 5, wherein determining the specified rotational speed comprises determining the specified rotational speed depending on a current differential speed at the separating clutch (6) and depending on a current gradient of the differential speed at the separating clutch (6).

10. The method of claim 9, wherein, when the current differential speed at the separating clutch (6) and the current gradient of the differential speed at the separating clutch (6) are each less than a respective limiting value, either determining no specified rotational speed for the internal combustion engine (2) or determining a current rotational speed of the electric machine (3) as the specified rotational speed for the internal combustion engine (2).

11. The method of claim 9, wherein, when the current differential speed at the separating clutch (6) and/or the current gradient of the differential speed at the separating clutch (6) is greater than a corresponding limiting value, determining the current rotational speed of the electric machine (3) plus an offset as the specified rotational speed for the internal combustion engine (2).

12. A control system for operating a drive train of a motor vehicle, comprising:
an engine control unit (8) for open-loop control and/or closed-loop control of an internal combustion engine (2);
a hybrid control unit (10) for open-loop control and/or closed-loop control of an electric machine (3); and
a transmission control unit (9) for open-loop control and/or closed-loop control of a transmission (5),
wherein the transmission control unit (9) or the hybrid control unit (10) actuates a separating clutch (6) to engage in order to couple a previously decoupled internal combustion engine (2) in response to at least one first defined operating condition, the separating clutch (6) connected between the internal combustion engine (2) and the electric machine (3),
wherein the transmission control unit (9) or the hybrid control unit (10) aborts the coupling of the internal combustion engine (2) by actuating the separating clutch (6) to disengage in response to at least one second defined operating condition, the transmission control unit (9) or the hybrid control unit (10) also determining an absolute value of a torque currently transmitted or currently transmittable by the separating clutch (6),
wherein the transmission control unit (9) or the hybrid control unit (10) actuates the separating clutch (6) to disengage by disengaging the separating clutch (6) at a first speed when the absolute value of the torque currently transmitted or currently transmittable by the separating clutch (6) is less than a limiting value, and disengaging the separating clutch (6) at a second speed when the absolute value of the torque currently transmitted or currently transmittable by the separating clutch (6) is greater than the limiting value, wherein the second speed is less than the first speed, and
wherein the transmission control unit (9) or the hybrid control unit (10) disengages the separating clutch (6) at different rates depending on the absolute value of the torque currently transmitted or currently transmittable by the separating clutch (6).

13. A control system, comprising an engine control unit (8) for open-loop control and/or closed-loop control of an internal combustion engine (2), a hybrid control unit (10) for open-loop control and/or closed-loop control of an electric machine (3), and a transmission control unit (9) for open-loop control and/or closed-loop control of a transmission (5), wherein the control system is configured for implementing the method of claim 1 on a control side.

* * * * *